United States Patent
Mashiko

(10) Patent No.: US 7,247,067 B2
(45) Date of Patent: Jul. 24, 2007

(54) INTAKE MANIFOLD FOR SMALL WATERCRAFT

(75) Inventor: Tetsuya Mashiko, Shizuoka (JP)

(73) Assignee: Yamaha Marine Kabushiki Kaisha Co., Ltd., Shizuoka (JP)

( * ) Notice: Subject to any disclaimer, the term of this patent is extended or adjusted under 35 U.S.C. 154(b) by 80 days.

(21) Appl. No.: 10/866,384

(22) Filed: Jun. 11, 2004

(65) Prior Publication Data

US 2004/0253886 A1 Dec. 16, 2004

(30) Foreign Application Priority Data

Jun. 12, 2003 (JP) ............................. 2003-167266

(51) Int. Cl.
- B63H 21/32 (2006.01)
- B63H 21/38 (2006.01)
- F02M 35/10 (2006.01)
- F02M 35/104 (2006.01)
- F02M 35/16 (2006.01)

(52) U.S. Cl. ............... 440/88 A; 440/88 C; 440/89 R

(58) Field of Classification Search ............. 440/88 R, 440/88 A, 89 R, 88 C; 114/55.5, 55.55, 114/55.57; 123/184.24, 184.47, 184.48, 123/184.49
See application file for complete search history.

(56) References Cited

U.S. PATENT DOCUMENTS

| | | |
|---|---|---|
| 1,876,948 A | 9/1932 | Jahnke |
| 2,565,060 A | 8/1951 | Beardsley et al. |
| 3,554,322 A | 1/1971 | Deutschmann et al. |
| 3,703,877 A | 11/1972 | Ueda |
| 4,010,717 A | 3/1977 | Taplin |
| 4,035,171 A | 7/1977 | Reed et al. |
| 4,068,612 A | 1/1978 | Meiners |
| 4,198,217 A | 4/1980 | Erdmannsdorfer |
| 4,212,659 A | 7/1980 | Magrini |
| 4,267,811 A | 5/1981 | Springer |
| 4,300,488 A | 11/1981 | Cser |
| 4,319,657 A | 3/1982 | Nomura |
| 4,321,896 A | 3/1982 | Kasting |
| 4,326,374 A | 4/1982 | Streb |
| 4,353,211 A | 10/1982 | Cser et al. |
| 4,412,520 A | 11/1983 | Mitsuyasu et al. |
| 4,422,295 A | 12/1983 | Minami et al. |
| 4,475,617 A | 10/1984 | Minami et al. |
| 4,496,019 A | 1/1985 | Tanaka |
| 4,512,152 A | 4/1985 | Asaba |
| 4,513,725 A | 4/1985 | Minami et al. |
| RE31,877 E | 5/1985 | Nomura |
| 4,519,373 A | 5/1985 | Hardy et al. |
| 4,538,556 A | 9/1985 | Takeda |
| 4,553,515 A | 11/1985 | King et al. |
| 4,630,446 A | 12/1986 | Iwai et al. |
| 4,633,826 A | 1/1987 | Tominaga et al. |
| 4,662,323 A | 5/1987 | Moriya |
| 4,674,457 A | 6/1987 | Berger et al. |

(Continued)

FOREIGN PATENT DOCUMENTS

EP 0 500 139 B1 8/1992

(Continued)

Primary Examiner—Ajay Vasudeva
(74) Attorney, Agent, or Firm—Knobbe, Martens, Olson & Bear

(57) ABSTRACT

A watercraft has an engine that has an intake system, an exhaust system, and a cooling system. An intake manifold is positioned above a cooled exhaust pipe. This position of the intake manifold with relation to the cooled exhaust pipe allows the intake manifold to maintain a predetermined temperature without the aid of any water-cooling of the intake manifold.

13 Claims, 12 Drawing Sheets

U.S. PATENT DOCUMENTS

| | | |
|---|---|---|
| 4,677,826 A | 7/1987 | Iwai et al. |
| 4,678,441 A | 7/1987 | Murase |
| 4,709,682 A | 12/1987 | Kato |
| 4,712,517 A | 12/1987 | Anno et al. |
| 4,718,396 A | 1/1988 | Shimada et al. |
| 4,723,526 A | 2/1988 | Horiuchi et al. |
| 4,738,229 A | 4/1988 | Wada et al. |
| 4,741,302 A | 5/1988 | Oda et al. |
| 4,760,703 A | 8/1988 | Minami et al. |
| 4,773,361 A | 9/1988 | Toki et al. |
| 4,796,574 A | 1/1989 | Fuji et al. |
| 4,827,722 A | 5/1989 | Torigai |
| 4,848,170 A | 7/1989 | Inagaki et al. |
| 4,887,692 A | 12/1989 | Outani et al. |
| 4,896,734 A | 1/1990 | Horiuchi et al. |
| 4,900,343 A | 2/1990 | Minami et al. |
| 4,936,278 A | 6/1990 | Umeda |
| 4,972,807 A | 11/1990 | Morishita |
| 4,982,682 A | 1/1991 | Hattori |
| 4,984,528 A | 1/1991 | Kobayashi |
| 4,989,409 A | 2/1991 | Nakase et al. |
| 4,991,532 A | 2/1991 | Locke |
| 5,002,021 A | 3/1991 | Nakata et al. |
| 5,009,204 A | 4/1991 | Ishii |
| 5,014,816 A | 5/1991 | Dear et al. |
| 5,031,591 A | 7/1991 | Shinoda et al. |
| 5,060,622 A | 10/1991 | Suzuki |
| 5,088,280 A | 2/1992 | Scott-Scott et al. |
| 5,094,193 A | 3/1992 | Yoshikawa |
| 5,095,859 A | 3/1992 | Iwata et al. |
| 5,130,014 A | 7/1992 | Volz |
| 5,133,307 A | 7/1992 | Kurihara |
| 5,136,547 A | 8/1992 | Laukien |
| 5,136,993 A | 8/1992 | Ampferer et al. |
| 5,143,028 A | 9/1992 | Takahashi |
| 5,159,903 A | 11/1992 | Takahashi |
| RE34,226 E | 4/1993 | Morishita |
| 5,215,164 A | 6/1993 | Shibata |
| 5,239,950 A | 8/1993 | Takahashi |
| 5,243,945 A | 9/1993 | Katoh et al. |
| 5,253,618 A | 10/1993 | Takahashi et al. |
| 5,261,356 A | 11/1993 | Takahashi et al. |
| 5,293,846 A | 3/1994 | Takahashi |
| 5,299,423 A | 4/1994 | Shiozawa et al. |
| 5,330,374 A | 7/1994 | Ishino |
| 5,340,343 A | 8/1994 | Kawamukai et al. |
| 5,340,344 A | 8/1994 | Mineo et al. |
| 5,357,913 A | 10/1994 | Okumura et al. |
| 5,365,908 A | 11/1994 | Takii et al. |
| 5,377,629 A | 1/1995 | Brackett et al. |
| 5,377,634 A | 1/1995 | Taue |
| 5,389,022 A | 2/1995 | Kobayashi |
| 5,390,621 A | 2/1995 | Hattori et al. |
| RE34,922 E | 5/1995 | Hattori et al. |
| 5,438,946 A | 8/1995 | Kobayashi |
| 5,456,230 A | 10/1995 | VanRens et al. |
| 5,476,402 A | 12/1995 | Nakai et al. |
| 5,503,117 A | 4/1996 | Saito |
| 5,513,606 A | 5/1996 | Shibata |
| 5,529,027 A | 6/1996 | Okubo |
| 5,537,968 A | 7/1996 | Takahashi |
| 5,558,549 A | 9/1996 | Nakase et al. |
| 5,584,733 A | 12/1996 | Kobayashi |
| 5,586,922 A | 12/1996 | Kobayashi et al. |
| 5,603,301 A | 2/1997 | Sakurai et al. |
| 5,619,950 A | 4/1997 | Ikeda |
| 5,632,239 A | 5/1997 | Patyi et al. |
| 5,634,422 A | 6/1997 | Kobayashi et al. |
| 5,636,586 A | 6/1997 | Suganuma |
| 5,647,779 A | 7/1997 | Nanami |
| 5,660,155 A | 8/1997 | Taue et al. |
| 5,660,571 A | 8/1997 | Nakayasu et al. |
| 5,664,515 A | 9/1997 | Hattori et al. |
| 5,671,703 A | 9/1997 | Otome et al. |
| 5,678,525 A | 10/1997 | Taue |
| 5,682,870 A | 11/1997 | Motoyama |
| 5,699,749 A | 12/1997 | Yamada et al. |
| 5,709,185 A | 1/1998 | Aizawa et al. |
| 5,709,186 A | 1/1998 | Taue |
| 5,709,198 A | 1/1998 | Sagisaka et al. |
| 5,743,206 A | 4/1998 | Hattori |
| 5,755,194 A | 5/1998 | Moorman et al. |
| 5,769,039 A | 6/1998 | Taue et al. |
| 5,775,283 A | 7/1998 | Sawai et al. |
| 5,778,833 A | 7/1998 | Kuranishi |
| 5,778,838 A | 7/1998 | Taue |
| 5,778,857 A | 7/1998 | Nakamura et al. |
| 5,797,778 A | 8/1998 | Ito et al. |
| 5,820,426 A | 10/1998 | Hale |
| 5,827,096 A | 10/1998 | Mineo |
| 5,829,402 A | 11/1998 | Takahashi et al. |
| 5,830,021 A | 11/1998 | Takahashi et al. |
| 5,839,930 A | 11/1998 | Nanami et al. |
| 5,845,618 A | 12/1998 | Taue et al. |
| 5,846,102 A | 12/1998 | Nitta et al. |
| 5,855,193 A | 1/1999 | Takahashi |
| 5,899,778 A | 5/1999 | Hiraoka et al. |
| 5,902,161 A | 5/1999 | Nakase |
| 5,906,083 A | 5/1999 | Olsen et al. |
| 5,908,337 A | 6/1999 | Mashiko |
| 5,911,211 A | 6/1999 | Uchida |
| 5,928,044 A | 7/1999 | Mineo |
| 5,937,818 A | 8/1999 | Kawai et al. |
| 5,937,825 A | 8/1999 | Motose |
| 5,941,223 A | 8/1999 | Kato |
| 5,951,343 A | 9/1999 | Nanami et al. |
| 5,957,072 A | 9/1999 | Hattori |
| 5,957,112 A | 9/1999 | Takahashi et al. |
| 5,960,770 A | 10/1999 | Taue et al. |
| 5,983,878 A | 11/1999 | Nonaka et al. |
| 6,009,705 A | 1/2000 | Arnott et al. |
| 6,015,320 A | 1/2000 | Nanami |
| 6,015,321 A | 1/2000 | Ozawa et al. |
| 6,016,782 A | 1/2000 | Henmi |
| 6,022,252 A | 2/2000 | Ozawa |
| 6,026,775 A | 2/2000 | Yamane |
| 6,029,638 A | 2/2000 | Funai et al. |
| 6,041,758 A | 3/2000 | Ishii |
| 6,055,959 A | 5/2000 | Taue |
| 6,079,378 A | 6/2000 | Taue et al. |
| 6,085,702 A | 7/2000 | Ito |
| 6,099,371 A | 8/2000 | Nozawa et al. |
| 6,142,842 A | 11/2000 | Watanabe et al. |
| 6,149,477 A | 11/2000 | Toyama |
| 6,171,380 B1 | 1/2001 | Wood et al. |
| 6,205,987 B1 | 3/2001 | Shigedomi et al. |
| 6,263,851 B1 | 7/2001 | Henmi |
| 6,269,797 B1 | 8/2001 | Uchida |
| 6,279,372 B1 | 8/2001 | Zhang |
| 6,286,492 B1 | 9/2001 | Kanno |
| 6,302,752 B1 | 10/2001 | Ito et al. |
| 6,312,299 B1 | 11/2001 | Henmi |
| 6,390,869 B2 | 5/2002 | Korenjak et al. |
| 6,394,060 B2 | 5/2002 | Nagai et al. |
| 6,415,759 B2 | 7/2002 | Ohrnberger et al. |
| 6,447,351 B1 | 9/2002 | Nanami |
| 6,453,890 B1 | 9/2002 | Kageyama et al. |
| 6,497,596 B1 | 12/2002 | Nanami |
| 6,517,397 B1 | 2/2003 | Gohara et al. |
| 6,544,086 B2 | 4/2003 | Tscherne et al. |
| 6,568,376 B2 | 5/2003 | Sonnleitner et al. |
| 6,578,508 B2 * | 6/2003 | Hattori et al. ............ 114/55.57 |
| 6,591,819 B2 | 7/2003 | Tscherne et al. |
| 6,601,528 B2 * | 8/2003 | Bilek et al. ................ 114/55.5 |

| | | | | | | |
|---|---|---|---|---|---|---|
| | 6,623,321 B2 | 9/2003 | Ishino | JP | 01-301917 | 12/1989 |
| | 6,626,140 B2 | 9/2003 | Aichinger et al. | JP | 01-301918 | 12/1989 |
| | 6,637,406 B2 | 10/2003 | Yamada et al. | JP | 01-301919 | 12/1989 |
| | 6,640,754 B1 | 11/2003 | Iida | JP | 01-313624 | 12/1989 |
| | 6,672,918 B2 | 1/2004 | Mashiko et al. | JP | 02-006289 | 1/1990 |
| | 6,769,942 B2 | 8/2004 | Bourret et al. | JP | 02-016327 | 1/1990 |
| | 6,793,546 B2 * | 9/2004 | Matsuda ............... 440/88 C | JP | 02-024282 | 1/1990 |
| | 6,810,855 B2 | 11/2004 | Hasegawa et al. | JP | 02-024283 | 1/1990 |
| | 6,896,566 B2 * | 5/2005 | Takahashi et al. ........ 440/88 A | JP | 02-024284 | 1/1990 |
| | 7,007,682 B2 | 3/2006 | Takahashi et al. | JP | 02-070920 | 3/1990 |
| | 7,101,238 B2 | 9/2006 | Aichinger et al. | JP | 02-119636 | 5/1990 |
| | 2001/0044352 A1 | 11/2001 | Korenjak et al. | JP | 02-175491 | 7/1990 |
| | 2002/0025742 A1 | 2/2002 | Berthiaume et al. | JP | 02-188624 | 7/1990 |
| | | | | JP | 02-201026 | 8/1990 |
| | FOREIGN PATENT DOCUMENTS | | | JP | 02-294520 | 12/1990 |
| | | | | JP | 03-021584 | 1/1991 |
| FR | 1263608 | | 5/1996 | JP | 03-023317 | 1/1991 |
| JP | 57-062929 | | 4/1982 | JP | 03-047425 | 2/1991 |
| JP | 57-062930 | | 4/1982 | JP | 03-168352 | 7/1991 |
| JP | 57-073817 | | 5/1982 | JP | 03-179152 | 8/1991 |
| JP | 57-073818 | | 5/1982 | JP | 03-182635 | 8/1991 |
| JP | 57-073820 | | 5/1982 | JP | 03-281939 | 12/1991 |
| JP | 57-083632 | | 5/1982 | JP | 04-081325 | 3/1992 |
| JP | 57-093627 | | 6/1982 | JP | 04-203317 | 7/1992 |
| JP | 57-105537 | | 7/1982 | JP | 07-311626 | 11/1992 |
| JP | 57-113922 | | 7/1982 | JP | 05-141260 | 6/1993 |
| JP | 57-113944 | | 7/1982 | JP | 05-141262 | 6/1993 |
| JP | 57-151019 | | 9/1982 | JP | 05-332188 | 12/1993 |
| JP | 57-171027 | | 10/1982 | JP | 06-093869 | 4/1994 |
| JP | 57-181931 | | 11/1982 | JP | 06-212986 | 8/1994 |
| JP | 57-183512 | | 11/1982 | JP | 07-091264 | 4/1995 |
| JP | 57-191421 | | 11/1982 | JP | 07-145730 | 6/1995 |
| JP | 57-203822 | | 12/1982 | JP | 07-151006 | 6/1995 |
| JP | 58-044221 | | 3/1983 | JP | 07-317545 | 12/1995 |
| JP | 58-053655 | | 3/1983 | JP | 07-317555 | 12/1995 |
| JP | 58-057023 | | 4/1983 | JP | 07-317556 | 12/1995 |
| JP | 58-082038 | | 5/1983 | JP | 07-317557 | 12/1995 |
| JP | 58-128925 | | 8/1983 | JP | 08-028280 | 1/1996 |
| JP | 58-170628 | | 10/1983 | JP | 08-028285 | 1/1996 |
| JP | 58-185927 | | 10/1983 | JP | 08-104286 | 4/1996 |
| JP | 58-185929 | | 10/1983 | JP | 08-104295 | 4/1996 |
| JP | 58-185930 | | 10/1983 | JP | 08-114122 | 5/1996 |
| JP | 58-185931 | | 10/1983 | JP | 08-114123 | 5/1996 |
| JP | 58-185932 | | 10/1983 | JP | 08-114124 | 5/1996 |
| JP | 58-192924 | | 11/1983 | JP | 08-114125 | 5/1996 |
| JP | 58-194695 | | 11/1983 | JP | 08-151926 | 6/1996 |
| JP | 59-018228 | | 1/1984 | JP | 08-151965 | 6/1996 |
| JP | 59-053229 | | 3/1984 | JP | 08-296449 | 11/1996 |
| JP | 59-176419 | | 10/1984 | JP | 08-319840 | 12/1996 |
| JP | 59-201932 | | 11/1984 | JP | 08-319901 | 12/1996 |
| JP | 59-220492 | | 12/1984 | JP | 09-184426 | 7/1997 |
| JP | 60-119328 | | 6/1985 | JP | 09-287465 | 11/1997 |
| JP | 60-150445 | | 8/1985 | JP | 09-287467 | 11/1997 |
| JP | 60-240522 | | 11/1985 | JP | 09-287470 | 11/1997 |
| JP | 60-240523 | | 11/1985 | JP | 09-287471 | 11/1997 |
| JP | 60-240524 | | 11/1985 | JP | 09-287472 | 11/1997 |
| JP | 60-240525 | | 11/1985 | JP | 09-287475 | 11/1997 |
| JP | 61-126324 | | 6/1986 | JP | 09-287486 | 11/1997 |
| JP | 61-126325 | | 6/1986 | JP | 10-008973 | 1/1998 |
| JP | 61-215123 | | 9/1986 | JP | 10-008974 | 1/1998 |
| JP | 61-237824 | | 10/1986 | JP | 10-131818 | 5/1998 |
| JP | 62-060926 | | 3/1987 | JP | 2000-038968 | 2/2000 |
| JP | 01-119421 | | 5/1989 | JP | 2001-082160 | 3/2001 |
| JP | 01-182560 | | 7/1989 | JP | 2001098960 A * | 4/2001 |
| JP | 01-211615 | | 8/1989 | JP | 2001-233276 | 8/2001 |
| JP | 01-229786 | | 9/1989 | JP | 2001-233277 | 8/2001 |
| JP | 01-232112 | | 9/1989 | JP | 2001-263076 | 9/2001 |
| JP | 01-232113 | | 9/1989 | JP | 2003074445 A * | 3/2003 |
| JP | 01-232115 | | 9/1989 | JP | 2006-083713 | 3/2006 |
| JP | 01-232116 | | 9/1989 | | | |
| JP | 01-232118 | | 9/1989 | * cited by examiner | | | ium
INTAKE MANIFOLD FOR SMALL WATERCRAFT

PRIORITY INFORMATION

This application is based on and claims priority to Japanese Patent Application No. 2003-167266, filed Jun. 12, 2003, which is hereby expressly incorporated by reference in its entirety.

BACKGROUND OF THE INVENTION

1. Field of the Invention

The present invention generally relates to an intake manifold of an engine for a watercraft, and more particularly relates to an improved location of the intake manifold with respect to a location of an engine exhaust system.

2. Description of the Related Art

Personal watercraft feature internal combustion engines that generally are positioned below the seat of an operator. That is, the operator is positioned over the engine when seated on the personal watercraft. Due to this configuration, the engine, including the related intake and exhaust systems must be compactly configured. While the systems must be compactly configured, high engine performance and operational efficiency is desired.

In one configuration, the exhaust system includes a collector passage that extends along a side of the engine. An intake collector passage, such as an intake manifold, is positioned below the exhaust collector passage. As such, the intake collector passage is provided with a cooling jacket that wraps around the intake manifold. The cooling jacket is provided to insulate the intake manifold from the heat of the exhaust gases and the heat associated with the engine.

SUMMARY OF THE INVENTION

During operation of the watercraft, water may occasionally infiltrate an engine compartment in which the engine is positioned. The water in the engine compartment can, under certain circumstances, infiltrate the intake manifold due to its position below the exhaust manifold. The water can lead to corrosion of a throttle valve within the intake system and cause other operational difficulties within the engine.

Thus, one aspect of the present invention involves the recognition that the current placement of the intake system, if elevated, would make water infiltration into the induction system less likely. The refined placement of the intake manifold would be above the exhaust manifold, which would decrease the likelihood and/or the amount of heat transferred to the induction system.

Another aspect of the present invention involves a watercraft comprising a hull. An engine is disposed within the hull. A seat is generally positioned over the engine. The hull comprises a foot step on each lateral side of the seat. The engine comprises an engine body defining a cylinder. A combustion chamber is provided in the cylinder. A piston is disposed within the cylinder. The piston is connected to a crankshaft. The crankshaft extends in a longitudinal direction of the hull. The engine also comprises a cylinder head. The cylinder head comprises an intake port side that is located on one lateral side of the engine opposite an exhaust port side located on an opposite lateral side of the engine. An intake system comprises an intake manifold that communicates with the combustion chamber on the intake port side. An exhaust system communicates with the combustion chamber on the exhaust port side. The exhaust system comprises an exhaust conduit that extends along the intake port side of the engine to an outside environment. The intake manifold is positioned on the intake port side of the engine generally vertically above the exhaust conduit.

A further aspect of the present invention involves a watercraft that comprises a hull. A cavity is defined within the hull. An engine is positioned within the cavity. A straddle seat is positioned above the cavity. The engine comprises a crankshaft that extends generally fore and aft. A piston is connected to the crankshaft. The piston reciprocates along an axis that is inclined relative to an imaginary vertical plane that extends in a generally longitudinal direction. The engine also comprises a cylinder head in which an intake port and an exhaust port are defined. The intake port is positioned to a first side of the cylinder head and the exhaust port is positioned to a second side of the cylinder head. An intake runner extends generally upward and away from the intake port and an exhaust runner extends generally downward and away from the exhaust port. An intake manifold is connected to the intake runner and an exhaust manifold is connected to the exhaust runner. An exhaust conduit is connected to the exhaust manifold and is positioned below the intake manifold.

An additional aspect of the present invention involves a watercraft that comprises a hull. A cavity is defined within the hull. An engine is positioned within the cavity. The engine comprises a crankshaft that extends in a longitudinal direction of the watercraft. A seat is positioned over the engine. The engine comprises four cylinders. The cylinders are inclined relative to a generally vertical plane. The engine further comprises a cylinder head. An intake port for each of the cylinders is defined in the cylinder head. An exhaust port for each of the cylinders is defined in the cylinder head. The intake ports are generally positioned on a side of the cylinder head corresponding to an upper side of the inclined cylinders. The exhaust ports are generally positioned on an opposing side of the cylinder head. Exhaust runners extend generally downward from said cylinder head. An exhaust manifold is connected to the exhaust runners. The exhaust manifold extends along a first lateral face of the engine. A curved exhaust conduit is connected to a forward end of the exhaust manifold. The curved exhaust conduit extends upward at an angle across a forward end of the engine. The curved exhaust conduit is coupled to an exhaust pipe by a flexible joint. The exhaust pipe extends generally rearward and along a second lateral face of the engine. An intake manifold is positioned generally above the exhaust manifold. The intake manifold is connected to intake runners. The intake runners extend to the intake ports. The intake manifold is connected to a throttle valve and an air rectifier is positioned between the intake runners and the throttle valve.

BRIEF DESCRIPTION OF THE DRAWINGS

The foregoing features, aspects, and advantages of the present invention will now be described with reference to the drawings of some preferred embodiments that are intended to illustrate and not to limit the invention. The drawings comprise twelve figures in which.

DETAILED DESCRIPTION OF THE PREFERRED EMBODIMENTS

With reference to FIGS. 1 to 7, an overall configuration of a personal watercraft 10, including various features and aspects of the internal components of the watercraft will be described. The illustrated watercraft 10 employs an internal combustion engine 12, which is arranged and configured in accordance with certain features, aspects and advantages of the present invention. The described engine configuration, including various aspects of one or more of its associated subsystems (e.g., induction system, cooling system, exhaust system, etc.) have particular utility for use with personal watercraft, and thus, are described in the context of personal watercraft but also can be applied to other types of watercraft, such as, for example, small jet boats and the like.

Figure 1:
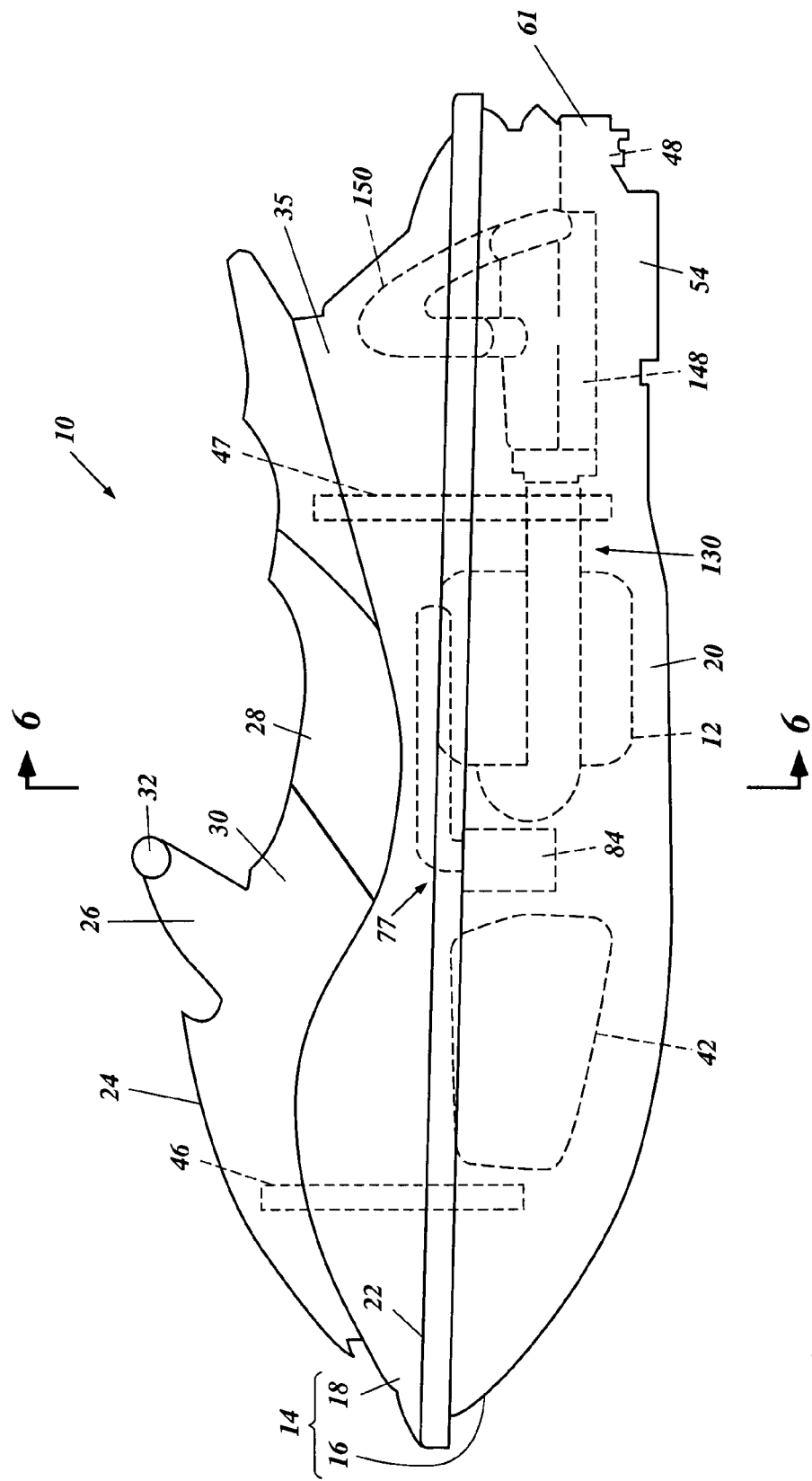
FIG. 1 is a side elevational view of a personal watercraft that can be arranged and configured in accordance with certain features, aspects and advantages of the present invention. Several of the internal components of the watercraft (e.g., the engine) are illustrated in phantom.
Figure 2:
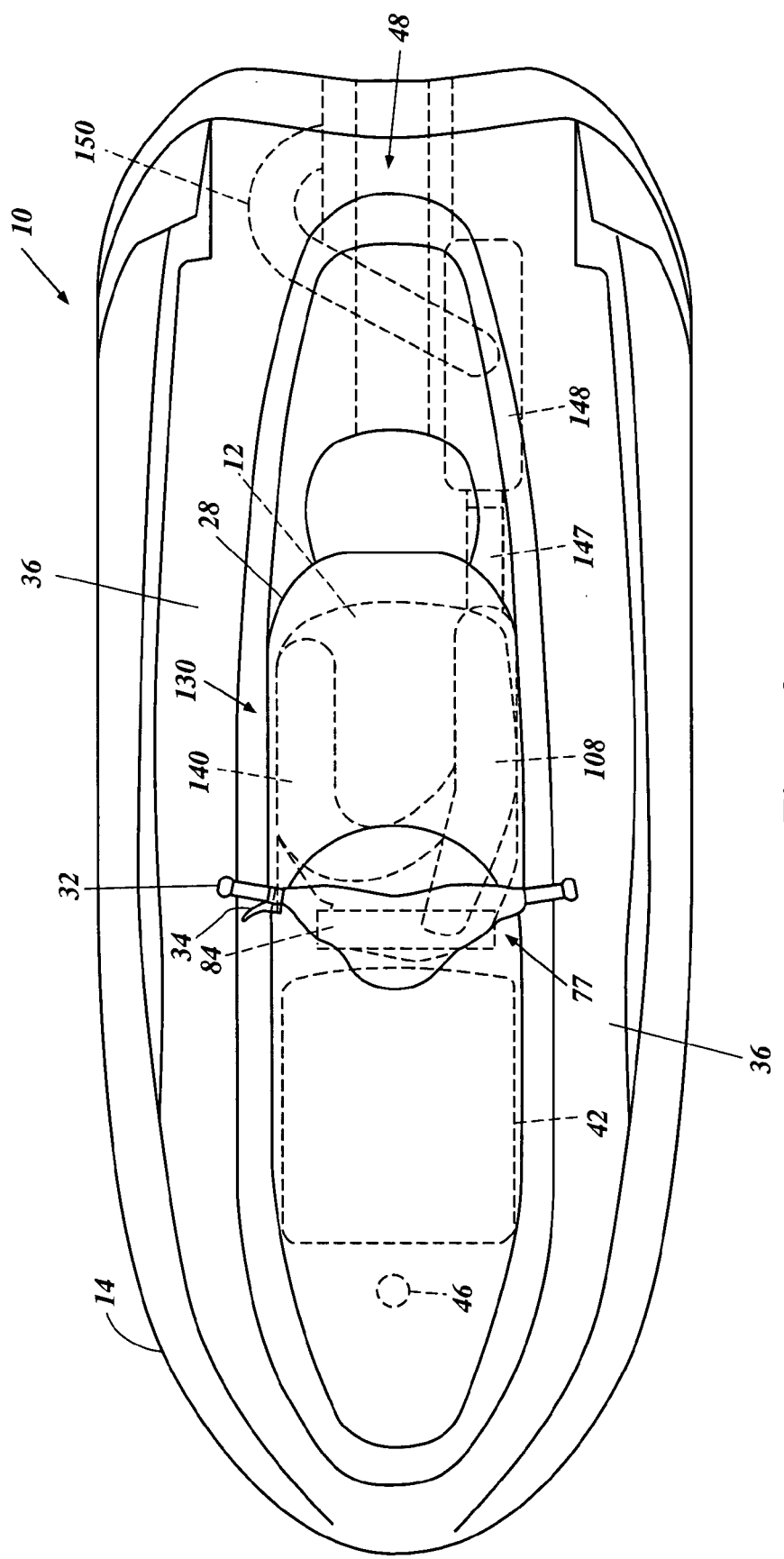
FIG. 2 is a top plan view of the watercraft of FIG. 1.

With reference initially to FIG. 1, the personal watercraft 10 includes a hull 14 formed with a lower hull section 16 and an upper hull section or deck 18. The lower hull section 16 and the upper hull section 18 preferably are coupled together to define an internal cavity 20. A bond flange 22 defines an intersection of both of the hull sections 16, 18. The illustrated upper hull section 14 preferably comprises a hatch cover 24, a control mast 26 and a seat 28, which are arranged generally in seriatim from fore to aft.

In the illustrated arrangement, a forward portion of the upper hull section 18 defines a bow portion 30 that slopes upwardly. An opening can be provided through the bow portion 30 so the rider can access the internal cavity 20. The hatch cover 24 can be detachably affixed or hinged to the bow portion 30 to cover the opening in a manner that allows the opening to be substantially sealed.

The control mast 26 extends upwardly to support a handle bar 32. The handle bar 32 is provided primarily for controlling the direction of the watercraft 10. The handle bar 32 preferably carries other mechanisms, such as, for example, a throttle lever 34 that is used to control the engine output (i.e., to vary the engine speed).

The seat 28 extends rearward from a portion just rearward of the bow portion 30. The seat 28 is disposed atop a pedestal 35 defined by the deck 18 (see FIG. 1). In the illustrated arrangement, the seat 28 has a saddle shape. Hence, a rider can sit on the seat 28 in a straddle fashion.

Foot areas 36 are defined on both sides of the seat 28 along a portion of the top surface of the upper hull section 18. The foot areas 36 are formed generally flat but may be inclined toward a suitable drain configuration.

A fuel tank 42 is positioned in the cavity 20 under the bow portion 30 of the upper hull section 18 in the illustrated arrangement. A duct (not shown) preferably couples the fuel tank 42 with a fuel inlet port positioned at a top surface of the bow 30 of the upper hull section 18. A closure cap (not shown) closes the fuel inlet port to inhibit water infiltration.

The engine 12 is disposed in an engine compartment that can defined within the cavity 20 by one or more bulkheads. The engine compartment preferably is located under the seat 28, but other locations are also possible (e.g., beneath the control mast or in the bow). In general, the engine compartment is defined within the cavity 20 by a forward and rearward bulkhead, which are not shown in the figures. Other configurations are possible.

A front air duct 46 and a rear air duct 47 are provided in the illustrated arrangement such that the air within the internal cavity 20 can be readily replenished or exchanged. The engine compartment, however, is substantially sealed to protect the engine 12 and other internal components from water. The ducts 46, 47 preferably extend from an upper portion of the watercraft 10 substantially to the bottom of the engine compartment or other portion of the hull. In addition, a water filtration arrangement (e.g., a labyrinth inlet) preferably can be provided at the inlet end to reduce the likelihood of water entering into the internal cavity of the watercraft through the ducts 46, 47. In some arrangements, one or more of the ducts each can be provided with a shut-off valve (not shown) at the upper ends, or in some less advantageous arrangements the lower ends. The shut-off valve (not shown) closes the respective duct when the watercraft is overturned such that the change water infiltration into the internal cavity can be reduced or eliminated.

The engine 12 drives a jet pump unit 48, which propels the illustrated watercraft 10. Other types of marine drives can be used depending upon the application. The jet pump unit 48 preferably is disposed within a tunnel (not shown) formed on the underside of the lower hull section 16. The tunnel has a downward facing inlet port opening toward the body of water. A jet pump housing 54 is disposed within a portion of the tunnel. Preferably, an impeller (not shown) is supported within the jet pump housing 54.

The jet pump unit 48 comprises an impeller shaft 56 that extends forwardly from the impeller and that is coupled with a crankshaft 58 of the engine 12 by a suitable coupling device 60. The crankshaft 58 of the engine 12 thus drives the impeller shaft 56. The impeller shaft in one arrangement extends from the engine compartment and into the tunnel.

The tunnel generally comprises a downwardly facing inlet and the housing 54 is positioned rearward of the inlet. The impeller (not shown) is positioned within the housing 54. The rear end of the housing 54 defines a discharge nozzle 61. Water drawn in through the inlet opening is ejected by the discharge nozzle 61 at varying flow rates depending upon the speed of the engine 12. The ejected water creates thrust, which propels the watercraft 12 through the body of water in which it is operating.

A steering nozzle (not shown) can be affixed proximate the discharge nozzle 61. The steering nozzle can be pivotally moved about a generally vertical steering axis. The steering nozzle is connected to the handle bar 32 by a cable or other suitable arrangement so that the rider can pivot the nozzle for steering the watercraft.

Figure 6:
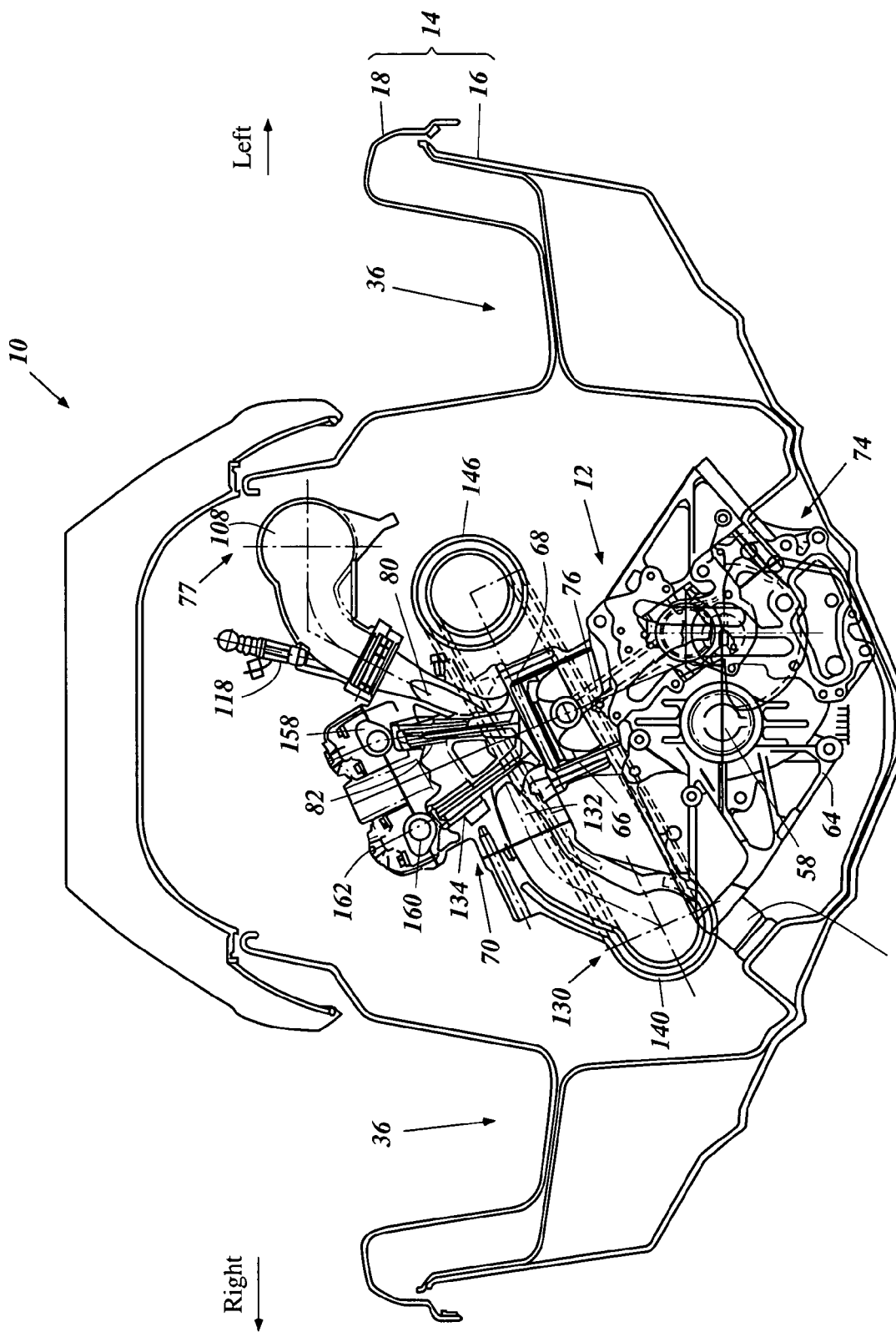
FIG. 6 is a schematic, cross-sectional front view of the watercraft and the engine taken along the line 6—6 in FIG. 1. A profile of a hull of the watercraft is shown schematically. Portions of the engine and an opening of an engine compartment of the hull are illustrated partially in section.
Figure 7:
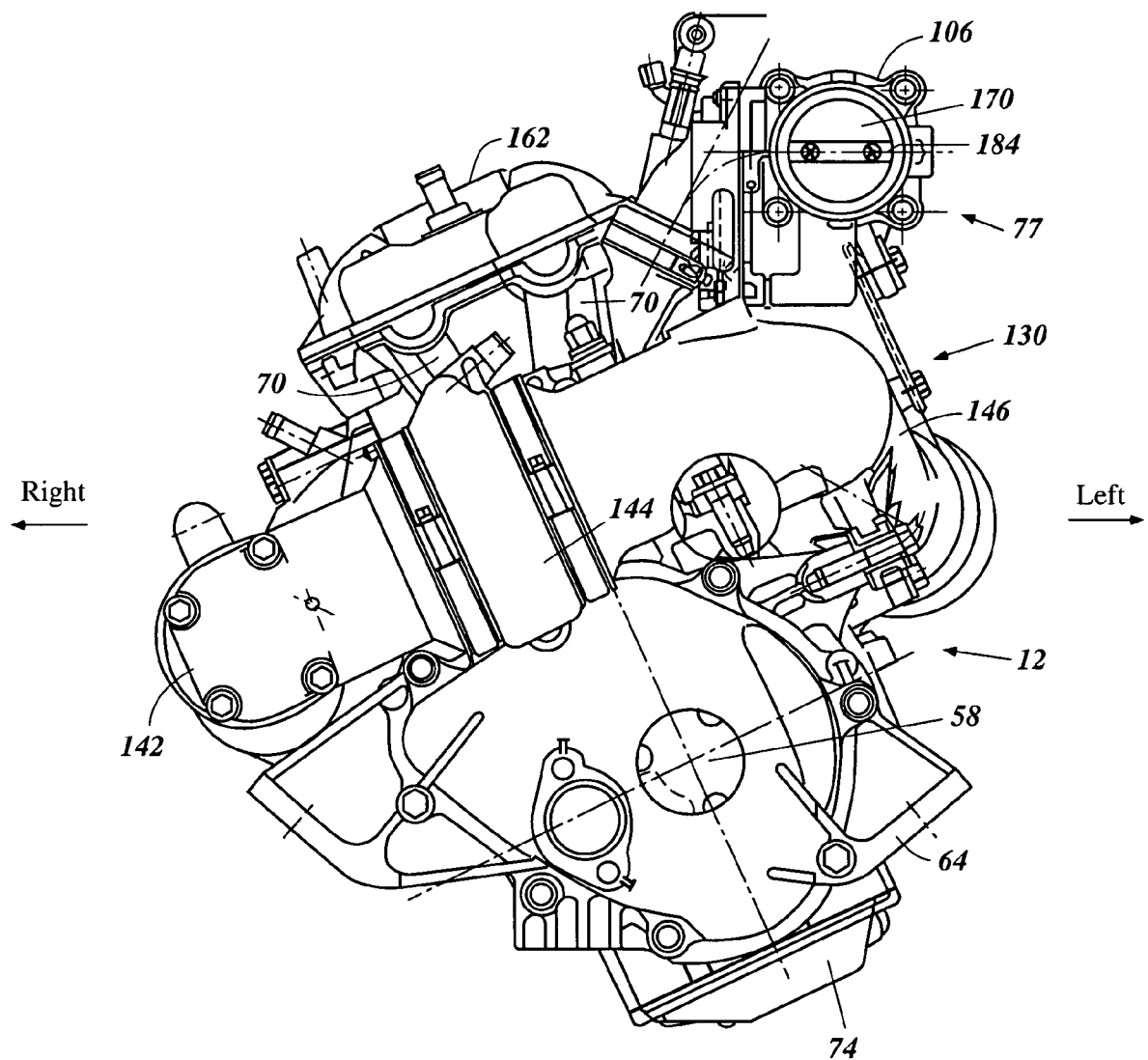
FIG. 7 is a front view of the engine removed from the watercraft illustrated in FIG. 1.

The engine 12 in the illustrated arrangement operates on a four-stroke cycle combustion principal. With reference to FIG. 6, the engine 12 includes a cylinder block 64 with four cylinder bores 66 formed side by side. The engine 12, thus, is an inclined L4 (in-line four cylinder) type. The illustrated engine, however, merely exemplifies one type of engine with which various aspects and features of the present invention can be used. Engines having a different number of cylinders, other cylinder arrangements, other cylinder orientations (e.g., upright cylinder banks, V-type, and W-type), and operating on other combustion principles (e.g., crankcase compression two-stroke, diesel, and rotary) are all practicable with respect to certain features, aspects and advantages of the present invention. Many orientations of the engine are also possible (e.g., with a transversely or vertically oriented crankshaft).

Figure 5:
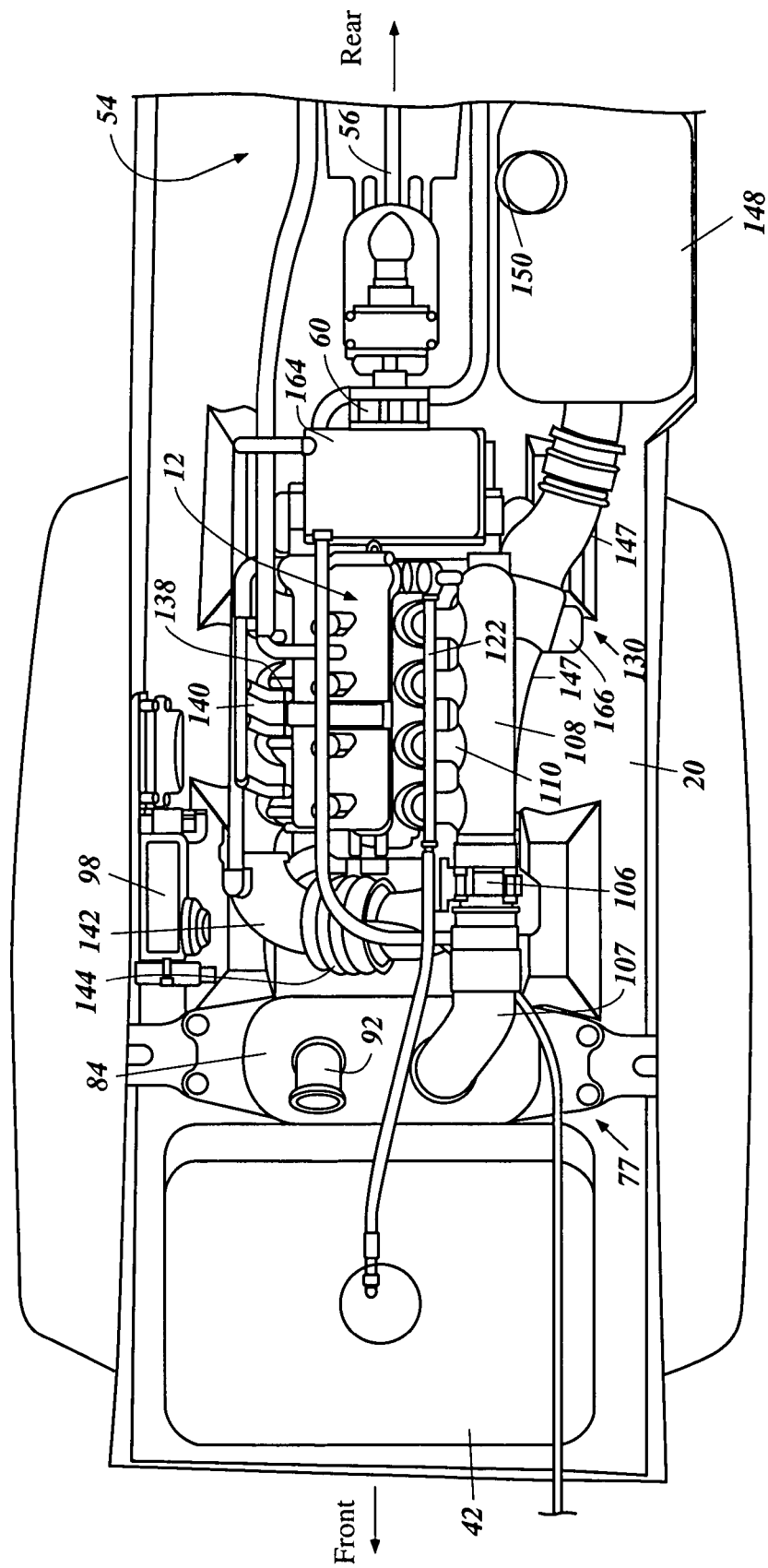
FIG. 5 is a top view of the engine and some related components.

With continued reference to FIG. 5, a piston 68 reciprocates in each cylinder bore 66 formed within the cylinder block 64. A cylinder head member 70 is affixed to the upper end of the cylinder block 64 to close respective upper ends of the cylinder bores 66. The cylinder head member 70, the cylinder bores 66 and the pistons 68 together define combustion chambers (not shown).

A lower cylinder block member or crankcase member 74 is affixed to the lower end of the cylinder block 64 to close the respective lower ends of the cylinder bores 66 and to define, in part, a crankshaft chamber. The crankshaft 58 is journaled between the cylinder block 64 and the lower cylinder block member 74. The crankshaft 58 is rotatably connected to the pistons 68 by connecting rods 76.

The cylinder block 64, the cylinder head member 70 and the crankcase member 74 together generally define an engine block of the engine 12. The engine 12 preferably is made of an aluminum-based alloy.

Engine mounts 78 preferably are positioned at both sides of the engine 12. The engine mounts 78 can include resilient portions made of, for example, a rubber material. The engine 12 preferably is mounted on the lower hull section 16, specifically, a hull liner, by the engine mounts 78 so that the engine 12 is greatly inhibited from conducting substantial vibration energy to the hull section 16.

The engine 12 preferably includes an air induction system 77 to guide air to the combustion chambers 72. In the illustrated embodiment, the air induction system 77 includes four air intake ports 80 defined within the cylinder head member 70. The intake ports 80 communicate with the four combustion chambers, respectfully. Other numbers of ports can be used depending upon the application. Furthermore, more than one port can be provided for each cylinder.

Intake valves 82 are provided to open and close the intake ports 80 such that flow through the ports 80 can be controlled. A camshaft arrangement can be used to control the intake valves 82, as discussed below. In some arrangements, the valves can be individually operable, such as through the use of motors, solenoids or the like.

The air induction 77 system also includes an air intake box 84 or plenum chamber for smoothing intake airflow and acting as an intake silencer. The intake box 84 in the illustrated embodiment is generally rectangular. Other shapes of the intake box are possible, but the air intake box 84 preferably is as large as possible while still allowing for positioning within the space provided in the engine compartment. In the illustrated arrangement, air is introduced into the air intake box 84 through an airbox inlet port 92. The air box 84 preferably is positioned between the engine and the fuel tank with the air box being slightly closer to the fuel tank than the engine. Thus, the air box helps to insulate the fuel tank from the heat generated by the engine. Optionally, the air box 84 can be made from plastic or metal.

In one advantageous arrangement, an ECU (not shown) is positioned in an electrical box 98. The ECU can be a microcomputer that includes a micro-controller having a CPU, a timer, RAM, and ROM. Other suitable configurations of the ECU also can be used. Preferably, the ECU is configured with or capable of accessing various maps to control engine operation in a suitable manner.

In order to determine appropriate engine operation control scenarios, the ECU preferably uses control maps and/or indices stored within or accessible to the ECU in combination with data collected from various input sensors. The ECU's various input sensors can include, but are not limited to, the throttle position sensor, the manifold pressure sensor, the engine coolant temperature sensor, an oxygen ($O_2$) sensor (not shown), and the crankshaft speed sensor.

It should be noted that the above-identified sensors merely correspond to some of the sensors that can be used for engine control and it is, of course, practicable to provide other sensors, such as an intake air pressure sensor, an intake air temperature sensor, a knock sensor, a neutral sensor, a watercraft pitch sensor, a shift position sensor and an atmospheric temperature sensor. The selected sensors can be provided for sensing engine running conditions, ambient conditions or other conditions of the engine 12 or associated watercraft 10.

A throttle body 106 is positioned on the port side of the watercraft 10 relative to the engine 12. Air from the air intake box 84 is drawn through an intake pipe 107, through the throttle body 106 into an air intake manifold 108. Air is delivered from the intake manifold 108 through individual intake passages 110 to the intake ports 80 that lead into the combustion chambers 72 when negative pressure is generated in the combustion chambers 72. The negative pressure is generated when the pistons 68 move in the direction defined from the top dead center position to the bottom dead center position during the intake stroke.

A throttle valve position sensor (not shown) preferably is arranged proximate the throttle valve body 106 in the illustrated arrangement. The sensor can generate a signal that is representative of either absolute throttle position or movement of the throttle shaft. Thus, in some arrangements, the signal from the throttle valve position sensor corresponds generally to the engine load, as may be indicated by the degree of throttle opening. In some applications, a manifold pressure sensor (not shown) can also be provided to detect engine load. Additionally, an induction air temperature sensor (not shown) can be provided to detect induction air temperature. The signal from the sensors can be sent to the ECU via respective data lines. These signals, along with other signals, can be used to control various aspects of engine operation, such as, for example, but without limitation, fuel injection amount, fuel injection timing, ignition timing and the like.

The engine 12 also includes a fuel injection system which preferably includes four fuel injectors 118, each having an injection nozzle exposed to the intake ports 80 so that injected fuel is directed toward the combustion chambers.

Thus, in the illustrated arrangement, the engine 12 features port fuel injection. It is anticipated that various features, aspects and advantages of the present invention also can be used with direct or other types of indirect fuel injection systems.

With reference to FIG. 5, fuel is drawn from the fuel tank 42 by a fuel pump (not shown), which is controlled by the ECU. The fuel is delivered to the fuel injectors 118 through a fuel delivery conduit 122. In operation, a predetermined amount of fuel is sprayed into the intake ports 80 via the injection nozzles of the fuel injectors 118. The timing and duration of the fuel injection can be controlled by the ECU based upon any desired control strategy. In one presently preferred configuration, the amount of fuel injected is based upon the sensed throttle valve position and the sensed manifold pressure, depending on the state of engine operation. The fuel charge delivered by the fuel injectors 118 then enters the combustion chambers with an air charge when the intake valves 82 open the intake ports 80.

The engine 12 further includes an ignition system. In the illustrated arrangement, four spark plugs (not shown) are fixed on the cylinder head member 70. The electrodes of the spark plugs are exposed within the respective combustion chambers 72. The spark plugs ignite the air/fuel charge just prior to, or during, each power stroke, preferably under the control of the ECU to ignite the air/fuel charge therein.

The engine 12 further includes an exhaust system 130 to discharge burnt charges, i.e., exhaust gases, from the combustion chambers. In the illustrated arrangement, the exhaust system 130 includes four exhaust ports 132 that generally correspond to, and communicate with, the combustion chambers. The exhaust ports 132 preferably are defined in the cylinder head member 70. Exhaust valves 134 preferably are provided to selectively open and close the exhaust ports 132. A suitable exhaust cam arrangement, such as that described below, can be provided to operate the exhaust valves 134.

With reference now to FIGS. 4–7, the illustrated exhaust system 130 preferably comprises a number of exhaust runners 138 that extends downwardly from each exhaust port 132. The runners 138 extend to an enlarged exhaust manifold 140. The runners 138 preferably are formed of an aluminum material. The diameters of the runners 138 preferably increase in a downstream direction (e.g., forward in the illustrated arrangement). This increase in respective diameters improves engine performance by allowing more uniform exhaust passage from the cylinders as a whole. The downwardly directed runners 138 place the exhaust manifold 140 in a lowered positioned, which effectively lowers the center of gravity of the watercraft relative to arrangements featuring an elevated exhaust manifold, which has been common in the watercraft industry. Moreover, the lowered position can help reduce sound emissions and can reduce the likelihood of water flowing back into the cylinder through the exhaust system.

The exhaust manifold 140 extends along a lower portion of a starboard face of the engine in the illustrated arrangement. Preferably, the manifold 140 is formed as a double walled pipe and comprises an aluminum body. Between the two walls, a cooling passage can be defined.

The manifold 140 is closed at its upstream or rear end and extends in a generally forward direction. In one arrangement, the manifold 140 extends forward to about the forward end of the engine, when the manifold 140 is coupled to a first curved exhaust conduit 142. The first curved exhaust conduit 142, or ring joint, changes the flow direction by about 90 degrees and extends upward at an angle across the forward end of the engine and passes over a corner of the engine (see FIG. 6). A downstream end of the conduit 142 extends to a center portion of the engine in the illustrated arrangement.

The first conduit 142 is further coupled with an exhaust pipe 146 at a location generally forward of the engine 12. The first conduit and the exhaust pipe 146 preferably are connected by a flexible joint 144.

The exhaust pipe 146 extends rearward along a port side surface of the engine 12. In the illustrated arrangement, the exhaust pipe 146 is generally inclined along a forward face of the engine and then wraps to extend in a rearward direction. Preferably, the exhaust pipe 146 passes the port side surface of engine in a location about half way up the vertical dimension of the engine. More preferably, the exhaust pipe 146 is spaced below the intake manifold 108 such that cooling air can circulate or pass through the region to reduce the likelihood or degree of heat transfer from the exhaust system to the intake system. The exhaust pipe 146 can be formed of aluminum in a double wall construction. Thus, a cooling jacket substantially wraps the exhaust pipe 146, which further reduces the likelihood or degree of heat transfer.

The exhaust pipe 146 is connected through a flexible sleeve 147 to a water-lock 148 proximate a forward surface of the water-lock 148. The water-lock 148 in the illustrated arrangement generally comprises an enlarged substantially cylindrical member. Other constructions can be used. A discharge pipe 150 extends from a top surface of the water-lock 148. The discharge pipe 150 bends transversely across the center plane and rearward toward a stem of the watercraft. Preferably, the discharge pipe 150 opens at a stern of the lower hull section 16 in a submerged position. As is known, the water-lock 148 generally inhibits water in the discharge pipe 150 or the water-lock itself from entering the exhaust pipe 146.

The engine 12 further includes a cooling system 152 configured to circulate coolant into thermal communication with at least one component within the watercraft 10. Preferably, the cooling system 152 is an open-loop type of cooling system that circulates water drawn from the body of water in which the watercraft 10 is operating through thermal communication with heat generating components of the watercraft 10 and the engine 12. It is expected that other types of cooling systems can be used in some applications. For instance, in some applications, a closed-loop type liquid cooling system can be used to cool lubricant and other components.

The present cooling system 152 preferably includes a water pump arranged to introduce water from the body of water surrounding the watercraft 10. The jet propulsion unit preferably is used as the water pump with a portion of the water pressurized by the impeller being drawn off for use in the cooling system.

As described above, at least some portions of the exhaust system 130 can comprise double-walled components such that coolant can flow between the two walls (i.e., the inner and outer wall) while the exhaust gases flow within a lumen defined by the inner wall.

An engine coolant temperature sensor (not shown) preferably is positioned to sense the temperature of the coolant circulating through the engine. The sensor (not shown) preferably can be used to sense the temperature proximate the cylinders of the engine. The sensor could be used to detect the temperature in other regions of the cooling system; however, by sensing the temperature proximate the cylinders of the engine, the temperature of the combustion chamber and the closely positioned portions of the induction system can be more accurately reflected. The cooling system 152 and its relationship with the air induction system 77 and the exhaust system 130 will be explained in greater detail below.

With reference to FIG. 6, the engine 12 preferably has a valve cam mechanism for actuating the intake and exhaust valves 82, 134. In the illustrated embodiment, a double overhead camshaft drive is employed. That is, an intake camshaft 158 actuates the intake valves 82 and an exhaust camshaft 160 separately actuates the exhaust valves 134. The intake camshaft 158 extends generally horizontally over the intake valves 82 from fore to aft, and the exhaust camshaft 160 extends generally horizontally over the exhaust valves 134 also from fore to aft.

Both the intake and exhaust camshafts 158, 160 are journaled in the cylinder head member 70 in any suitable manner. A cylinder head cover member 162 extends over the camshafts 158, 160, and is affixed to the cylinder head member 70 to define a camshaft chamber.

The intake camshaft 158 has cam lobes each associated with the respective intake valves 82, and the exhaust camshaft 160 also has cam lobes associated with respective exhaust valves 134. The intake and exhaust valves 82, 134 normally close the intake and exhaust ports 80, 132 by a biasing force of springs. When the intake and exhaust camshafts 158, 160 rotate, the cam lobes push the respective valves 82, 134 to open the respective ports 80, 132 by overcoming the biasing force of the spring. Air enters the combustion chambers 72 when the intake valves 82 open. In the same manner, the exhaust gases exit from the combustion chambers 72 when the exhaust valves 134 open.

The crankshaft 58 preferably drives the intake and exhaust camshafts 158, 160. The respective camshafts 158, 160 have driven sprockets affixed to ends thereof while the crankshaft 58 has a drive sprocket. Each driven sprocket has a diameter that is twice as large as a diameter of the drive sprocket. A timing chain or belt is wound around the drive and driven sprockets. When the crankshaft 58 rotates, the drive sprocket drives the driven sprockets via the timing chain, and thus the intake and exhaust camshafts 158, 160 also rotate.

Figure 3:
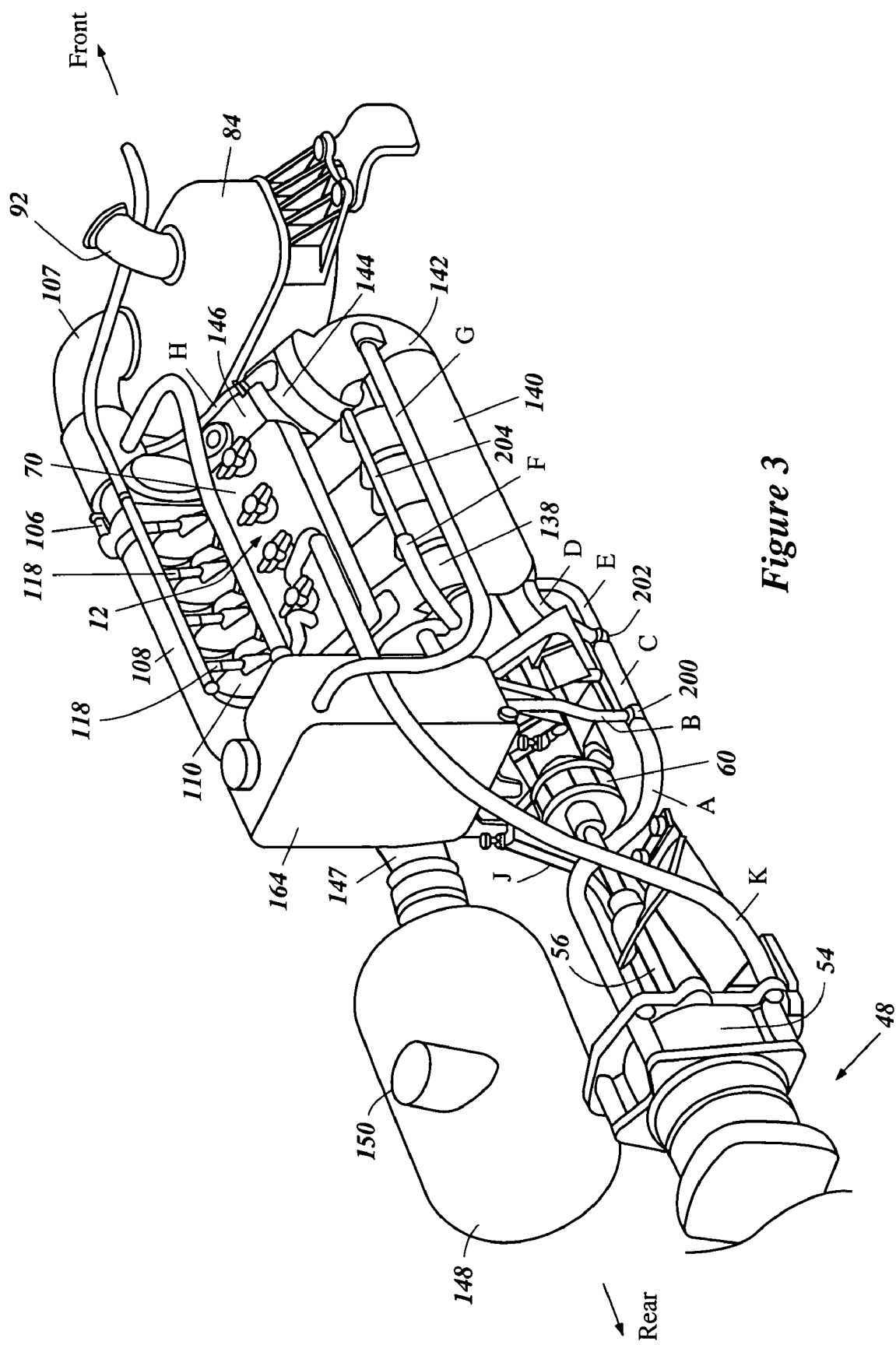
FIG. 3 is a rear, starboard, and top perspective view of the engine and some related components removed from the watercraft illustrated in FIG. 1.
Figure 4:
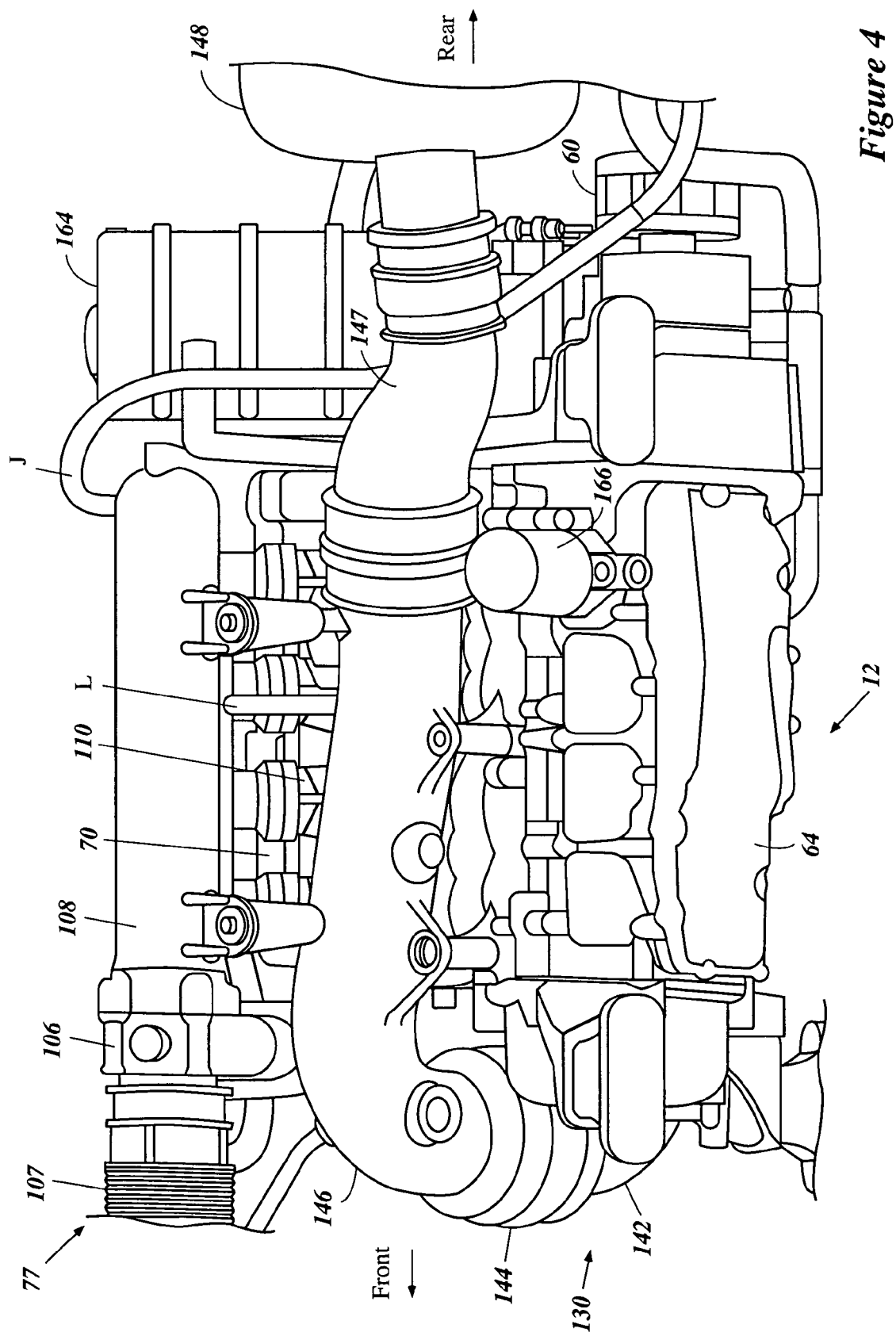
FIG. 4 is a port side view of the engine and some related components removed from the watercraft illustrated in FIG. 1.

The engine 12 preferably includes a lubrication system that delivers lubricant oil to engine portions for inhibiting frictional wear of such portions. In the illustrated embodiment, a dry-sump lubrication system is employed. This system is a closed-loop type and includes an oil reservoir 164, as illustrated in FIGS. 3 and 4.

An oil delivery pump is provided within a circulation loop to deliver the oil in the reservoir 164 through an oil filter 166 to the engine portions that are to be lubricated, for example, but without limitation, the pistons 68 and the crankshaft bearings (not shown). The crankshaft 58 or one of the camshafts 158, 160 preferably drives the delivery and return pumps.

During engine operation, ambient air enters the internal cavity 20 defined in the hull 14 through the air ducts 46, 47. The air is then introduced into the intake box 84 through the air inlet port 92 and drawn into the throttle body 106. The air filter element, which preferably comprises a water-repellent element and an oil resistant element, filters the air. The majority of the air in the air intake box 84 is supplied to the combustion chambers 72. The throttle body 106 regulates an amount of the air permitted to pass to the combustion chambers 72. The opening angle of a throttle valve 170, and thus, the airflow across the throttle valve 170, can be controlled by the rider with the throttle lever 34. The air flows into the combustion chambers 72 when the intake valves 82 opens. At the same time, the fuel injectors 118 spray fuel into the intake ports 80 under the control of the ECU. Air/fuel charges are thus formed and delivered to the combustion chambers 72. The air/fuel charges are fired by the spark plugs under the control of the ECU. The burnt charges, i.e., exhaust gases, are discharged to the body of water surrounding the watercraft 10 through the exhaust system 130.

The combustion of the air/fuel charges causes the pistons 68 to reciprocate and thus causes the crankshaft 58 to rotate. The crankshaft 58 drives the impeller shaft 56 and the impeller rotates in the hull tunnel 50. Water is thus drawn into the tunnel 50 through the inlet port 52 and then is discharged rearward through the steering nozzle 62. The rider steers the nozzle 62 by the steering handle bar 32. The watercraft 10 thus moves as the rider desires.

Figure 8:
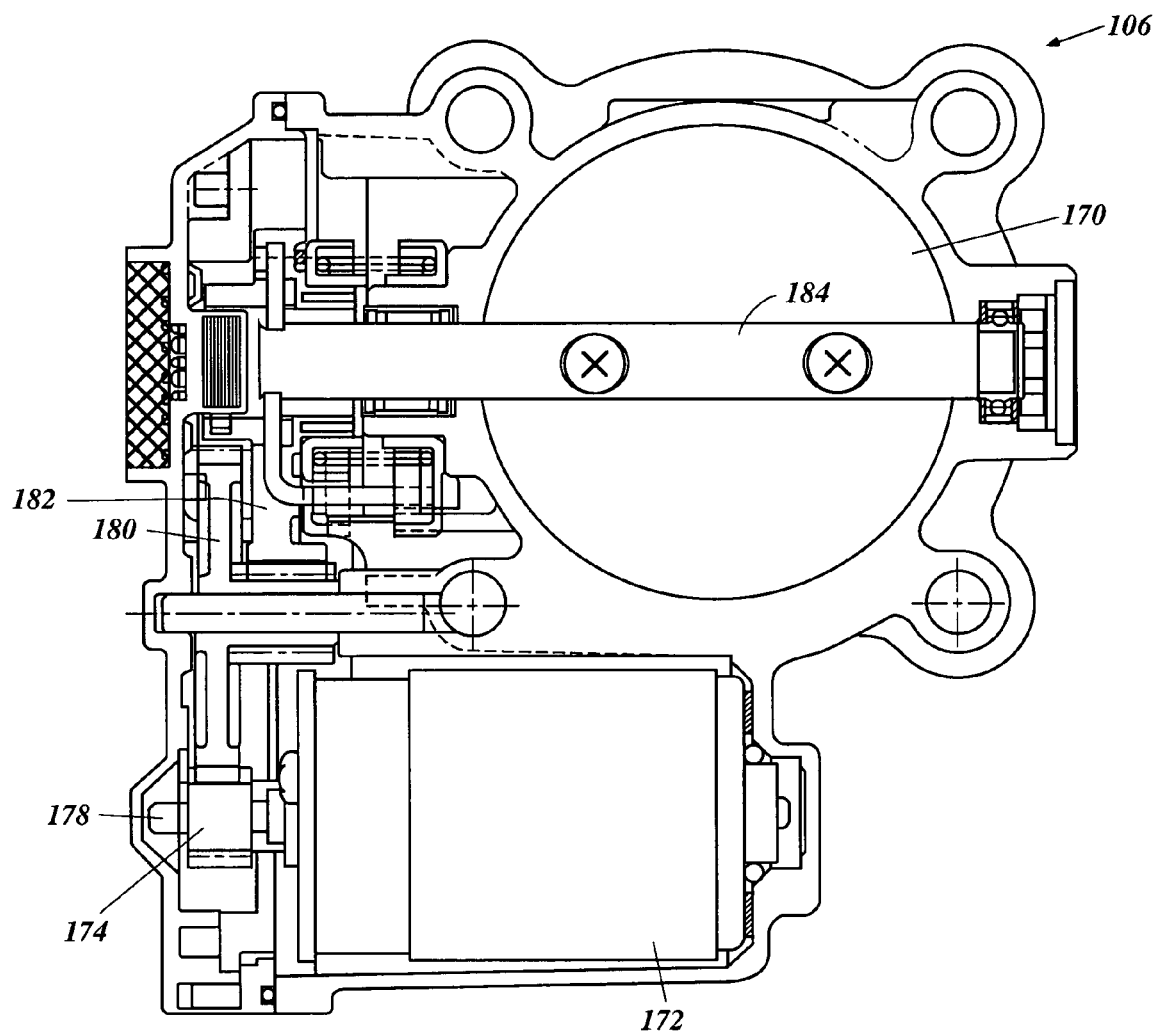
FIG. 8 is a simplified cross-sectional view of a throttle body, a throttle transmission mechanism, and an electric throttle motor used with the engine of the watercraft of FIG. 1.

With reference to FIG. 8, a cross sectional view of the throttle body 106 is shown in detail. In the illustrated arrangement, a throttle motor 172 activates the throttle 170 according to a driver's torque request. The driver's torque request can represent the position of the throttle lever 34. The throttle motor 172 turns a primary gear 174 that is connected to a motor shaft 178. The motor shaft 178 preferably extends in a generally horizontal orientation. The primary gear 174 transfers the rotational motion from the throttle motor 172 to an intermediate gear set 180. The intermediate gear set 180 transfers the throttle motor rotation to a throttle plate gear 182 that is connected to a throttle shaft 184 that directly communicates with the throttle 170. Therefore, when the throttle motor 172 is activated by the ECU according to a driver's torque request signal from the throttle lever 34, the throttle 170 is moved to a position representative of the torque request.

Figure 9:
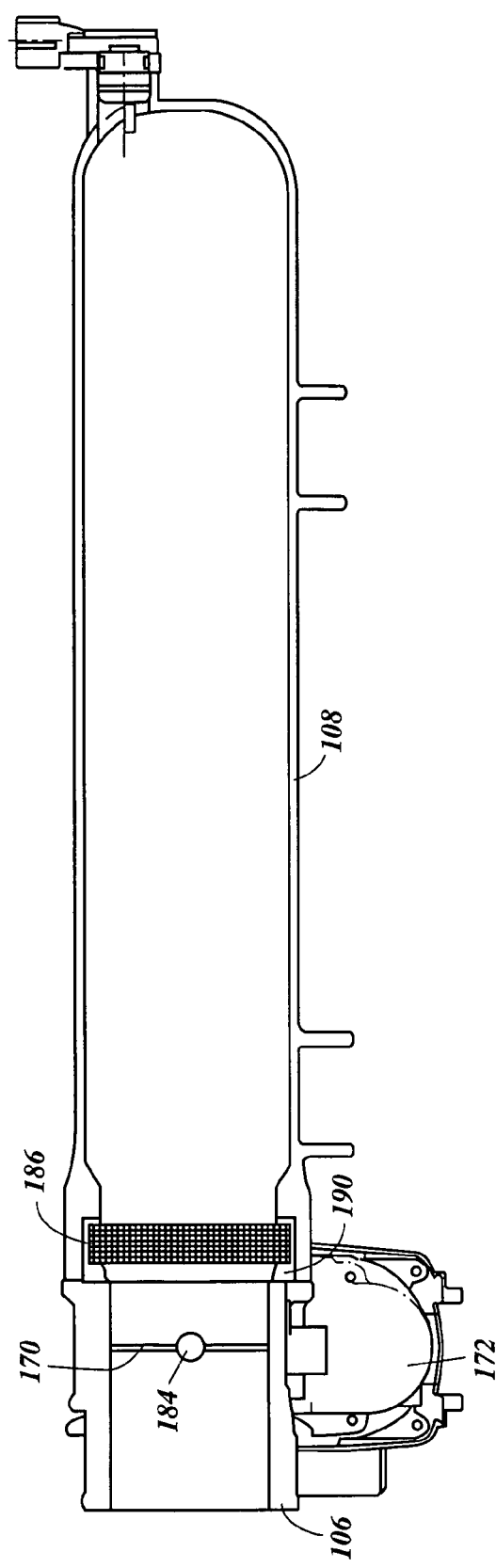
FIG. 9 is a cross-sectional view of an intake manifold and the throttle body of FIG. 8 assembled together.

FIG. 9 illustrates a cross sectional view of the throttle body 106, an air intake rectifier 186, and the air intake manifold 108. The air intake rectifier 186 is securely positioned at the entrance side of the air intake manifold 108. In some arrangements, separate rectifiers can be provided at each intake runner but the illustrated arrangement is preferred for its simplicity and lower cost. The air intake rectifier can be securely positioned by a variety of securing systems, however the preferred embodiment includes securing the air intake rectifier 186 by a surrounding rubber ring 190. The air intake rectifier 186 corrects or greatly reduces possible intake air turbulence that could hinder the volumetric efficiency of the air intake system 77. Disturbances and/or erratic air flow patterns can be substantially corrected by the air intake rectifier 186 to provide the combustion chambers with a smooth flowing air charge.

The rectifier 186 preferably comprises a stainless steel body, although other materials can be used. In one arrangement, the body is formed by rolling a corrugated strip of stainless steel into a coil. The air flow passes through the coil generally in the direction of the rotational axis about which the strip is coiled. Thus, many small axial tunnels are defined by the corrugations in the strip and the air passing through the throttle valve will pass through the small tunnels. In this manner, the air flow can be substantially "straightened" or "rectified." Moreover, the flow can be somewhat stratified by the rectifier into multiple distinct flows.

Figure 10:
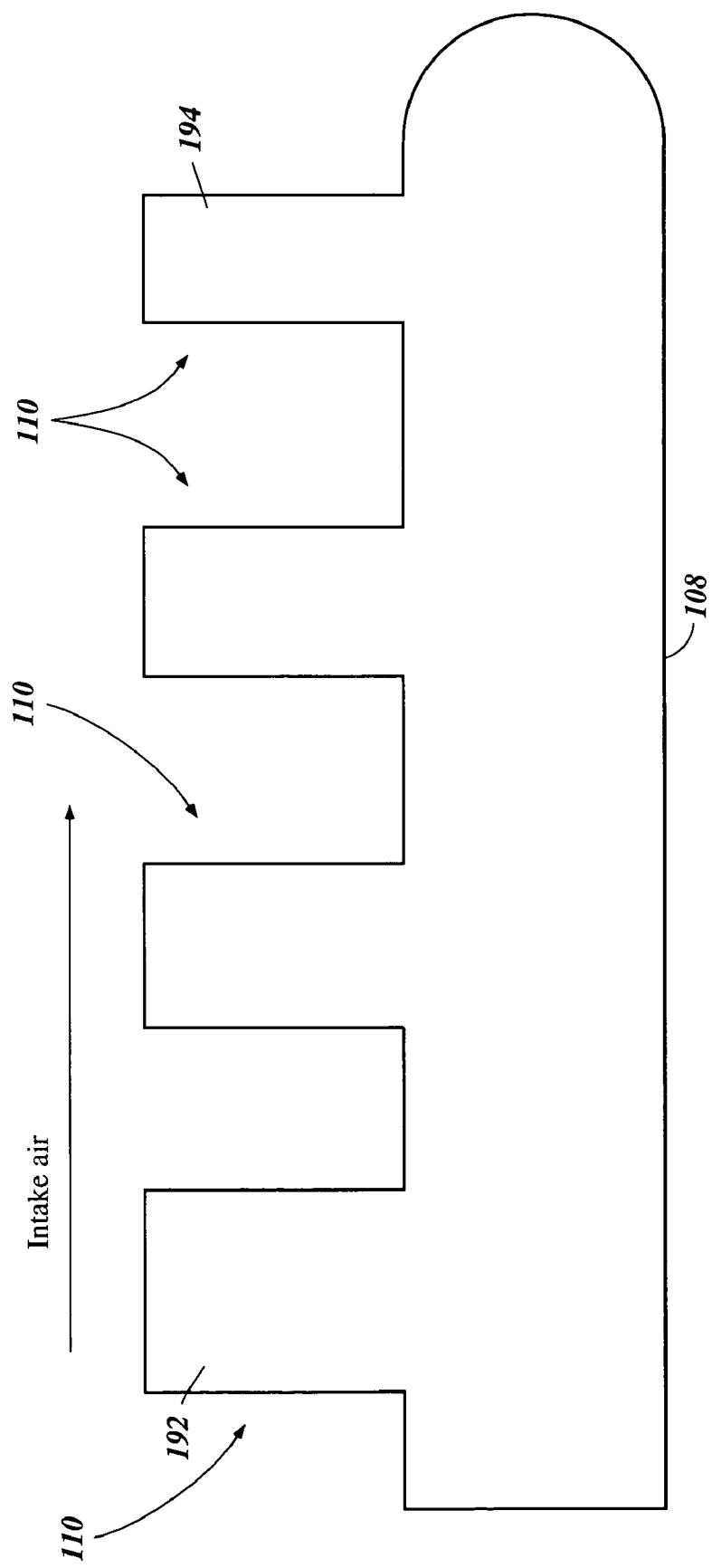
FIG. 10 is a schematic view of the intake manifold illustrating the intake air flow of the engine and a varied intake runner sizing.

With reference to FIG. 10, a simplified drawing of a preferred embodiment of the air intake manifold 108 is illustrated. In most arrangements, the intake manifold 108 is generally formed of tubing made from resin or aluminum alloy. Other materials and any suitable manufacturing processes can be used. The air intake manifold 108 shown in FIG. 10 is constructed with the individual air intake passages 110 having different inner diameters. The passages 110 preferably are formed of tubing made from resin or aluminum alloy. Other materials and any suitable manufacturing processes can be used. The inner diameters of the individual air intake passages decrease in the direction of airflow beginning with an air intake passage 192 having a largest inner diameter to a last individual air intake passage 194 that has a smallest inner diameter. The first air intake passage 192 with the largest inner diameter is positioned closest to the throttle body 106 and the last air intake passage 194 with the smallest inner diameter is positioned farthest from the throttle body 106. The decreasing size in individual air intake passage inner diameters allows for a balanced air charge filling of the combustion chambers. A balanced intake air charge increases volumetric efficiency improving engine performance. The passages 110 also angle downward from the manifold 108 to the cylinder head. The intake passages 192 also extend at an angle downward toward the ports such that the intake manifold can be elevated above the exhaust collector described above, which locates the intake manifold in an advantageous position.

Figure 11:
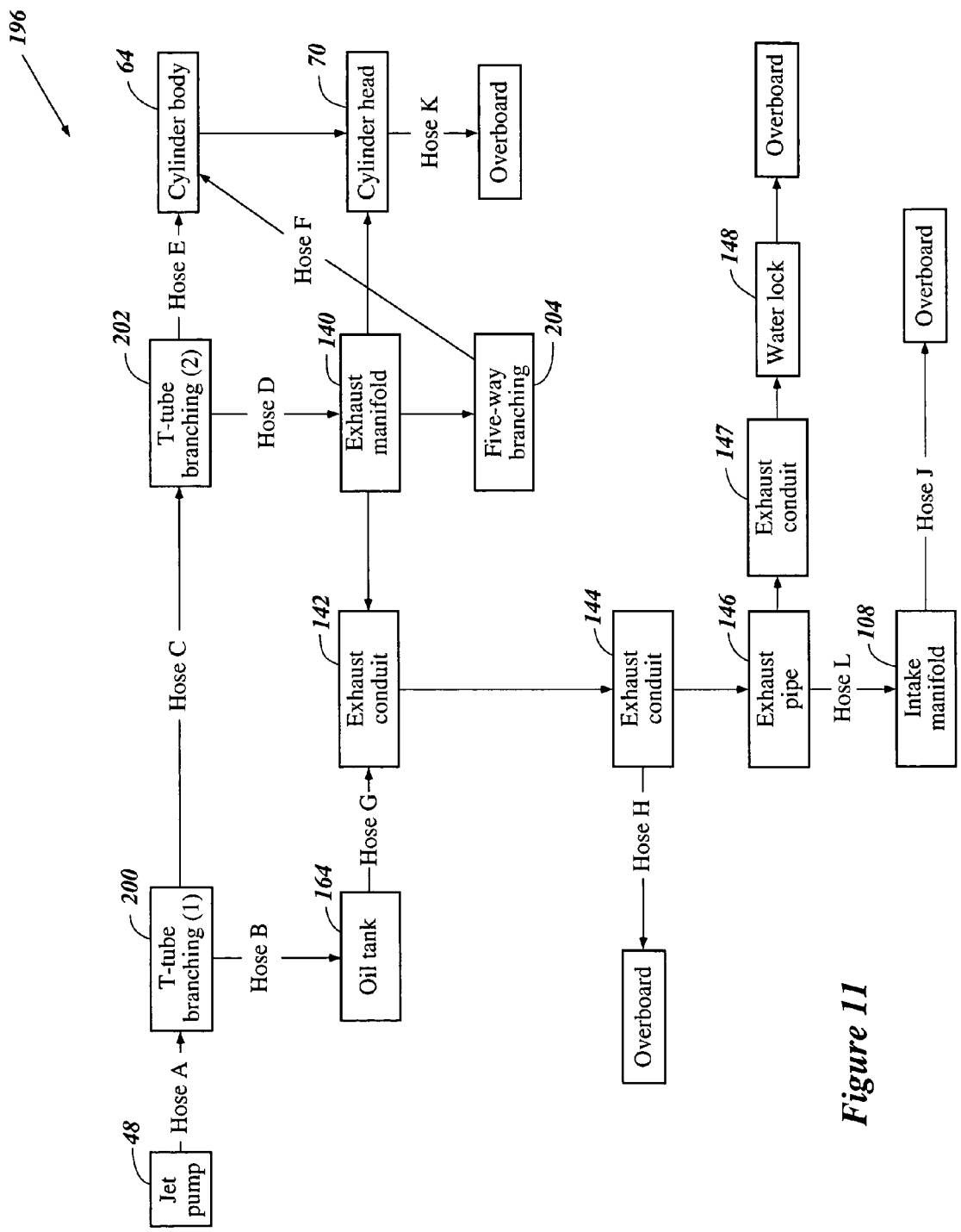
FIG. 11 is a block diagram illustrating various cooling paths of the engine and various engine subsystems including the muffler, the oil tank and the intake manifold.

The cooling system 156 and its relationship with the air induction system 77 and the exhaust system 130 will now by explained in greater detail. FIG. 11 shows a schematic diagram of a preferred embodiment of an engine cooling system 196. The engine cooling system 196 is an open loop cooling system that uses water from the outside environment to cool the engine 12 and various systems on the watercraft 10 and then returns the cooling water back to the outside environment. In some arrangements, a closed loop cooling system can be used. The various cooled systems on the watercraft 10 can include, but are not limited to, the oil tank 164, the manifold 140, the exhaust conduit 142, and the exhaust pipe 146.

A portion of water (or coolant) that is pressurized by the jet pump unit 48 to propel the watercraft 10 is diverted to a hose A and used to cool portions of the engine 12 as well as other watercraft systems. The coolant used to cool the engine 12 and watercraft system is delivered through the hose A to a distribution tube 200.

The distribution tube 200 distributes the coolant through a hose B to cool the oil tank 164 and through a hose C to another distribution tube 202. Cooling the oil tank 164 with the coolant keeps the lubricant stored inside the oil tank 164 at a temperature that allows the lubricant to optimally lubricate the engine 12. Cooling the oil tank 164 with the coolant promotes an optimal lubricant temperature and also keeps the internal cavity 20 from exceeding a predetermined temperature.

The distribution tube 202 further divides coolant between the exhaust manifold 140 through a hose D and the cylinder body 64 through a hose E. Both the cylinder body 64 and the manifold 140 partially deliver the coolant to the cylinder head 70. After cooling the cylinder head 70, the coolant then exits the watercraft 10 through a coolant hose K. The outlet from hose K can be to a visible location such that the operator can visually ascertain that coolant is passing through the cooling system.

As illustrated in FIG. 11, the exhaust manifold 140 also delivers a additional predetermined amount of coolant to another distribution tube 204 that delivers coolant to the cylinder body 64.

The coolant travels from the oil tank 164 through a coolant hose G to the first curved exhaust conduit 142. The exhaust conduit 142 also receives coolant from the exhaust manifold 140. Coolant that does not exit the watercraft 10 through the hose K is delivered from the exhaust conduit 142 to the second exhaust conduit 144.

A portion of the coolant travels from the exhaust conduit 144 and exits the watercraft 10, however coolant also travels from the exhaust conduit 144 to the exhaust pipe 146. Coolant from the exhaust conduit 146 is guided to the exhaust conduit 147 and further is guided to the water trap 148 before exiting the watercraft 10. Coolant is also guided to the intake manifold 108 through a hose L from the exhaust conduit 146 before exiting the watercraft 10 through a hose J.

Figure 12:
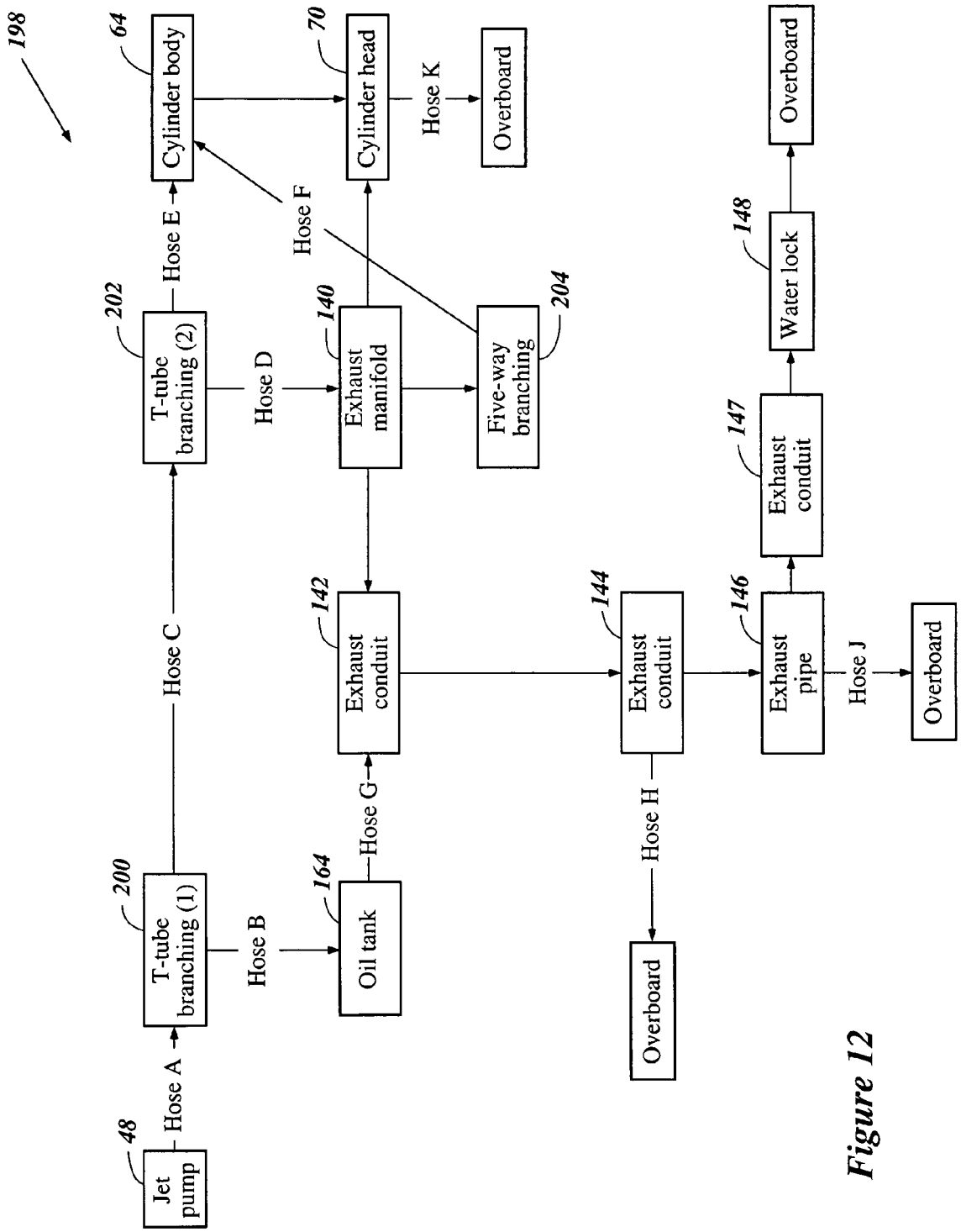
FIG. 12 is another block diagram illustrating various cooling paths of the engine and various engine subsystems including the muffler, and the oil tank.

With reference now to FIG. 12, another arrangement of the engine cooling system 196 is shown and referred to by the reference numeral 198. Due to an advantageous position of the intake manifold 108 above the exhaust conduit 146 the intake manifold maintains a proper operating temperature without the aid of any coolant. As illustrated in FIG. 12, the cooling hose L is omitted from the cooling system 196. Therefore, the portion of coolant that exits the exhaust pipe 146 to cool the intake manifold 108 is directly routed to exit the watercraft 10 through hose J since no cooling passage for the intake manifold 108 is present. The engine 12 as well as the various watercraft systems is cooled by the cooling water in the same manner as described above relating to FIG. 11.

Although the present invention has been described in terms of a certain preferred embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. A watercraft comprising a hull, an engine disposed within the hull, a seat generally positioned over the engine, the hull comprising a foot step on each lateral side of the seat, the engine comprising an engine body defining a cylinder, a combustion chamber provided in the cylinder, a piston disposed within the cylinder, the piston being connected to a crankshaft, the crankshaft extending in a longitudinal direction of the hull, the engine also comprising a cylinder head, the cylinder head comprising an intake port side that is located on one lateral side of the engine opposite an exhaust port side located on an opposite lateral side of the engine, an intake system comprising an intake manifold communicating with the combustion chamber on the intake port side and a plenum chamber connected to and disposed upstream from the intake manifold, and an exhaust system communicating with the combustion chamber on the exhaust port side, the exhaust system comprising an exhaust conduit that extends along the intake port side of the engine to an outside environment, the intake manifold being positioned on the intake port side of the engine generally vertically above the exhaust conduit, the plenum chamber being disposed lower than the intake manifold.

2. The watercraft of claim 1 additionally comprising an intake rectifier positioned within the intake manifold.

3. The watercraft of claim 2, wherein the intake rectifier is position in close vicinity to a throttle valve.

4. The watercraft of claim 1, wherein the intake manifold is made of plastic.

5. The watercraft of claim 1, wherein the intake manifold is at least partially made of metal.

6. The watercraft of claim 1, wherein the engine comprises an intake port and the intake manifold is connected to the intake port by an intake runner, the intake runner extending upward at an angle from the intake port to the intake manifold.

7. The watercraft of claim 1, wherein the engine comprises an exhaust port and the exhaust conduit is connected to the exhaust port, in part, by an exhaust runner, the exhaust runner being angled down and away from the engine.

8. A watercraft comprising a hull, a cavity defined within the hull, an engine positioned within the cavity, a straddle seat positioned above the cavity, the engine comprising a crankshaft that extends generally fore and aft, a piston being connected to the crankshaft, the piston reciprocating along an axis that is inclined relative to an imaginary vertical plane that extends in a generally longitudinal direction, the engine also comprising a cylinder head in which an intake port and an exhaust port are defined, the intake port being positioned on a first lateral side of the engine and the exhaust port being positioned on a opposing second lateral side of the engine, an intake runner extending generally upward and away from the intake port and an exhaust runner extending generally downward and away from the exhaust port, an intake manifold connected to the intake runner and an exhaust manifold connected to the exhaust runner, an exhaust conduit connected to the exhaust manifold and being positioned below the intake manifold on the first lateral side, and at least a first air plenum being connected to and disposed upstream from the intake manifold, the first air plenum being disposed lower than the intake manifold.

9. The watercraft of claim 8, wherein the intake runner extends upward at an angle from the intake port.

10. The watercraft of claim 9, wherein the exhaust runner extends downward at an angle from the exhaust port.

11. The watercraft of claim 8 further comprising a throttle valve connected to the intake manifold and a flow rectifier positioned between the throttle valve and the intake port.

12. The watercraft of claim 11, wherein the flow rectifier is positioned between the throttle valve and the intake runner.

13. A watercraft comprising a hull, a cavity defined within the hull, an engine positioned within the cavity, the engine comprising a crankshaft that extends in a longitudinal direction of the watercraft, a seat positioned over the engine, the engine comprising four cylinders, the cylinders being inclined relative to a generally vertical plane, the engine further comprising a cylinder head, an intake port for each of the cylinders being defined in the cylinder head, an exhaust port for each of the cylinders being defined in the cylinder head, the intake ports generally positioned on a side of the cylinder head corresponding to an upper side of the inclined cylinders, the exhaust ports generally positioned on an opposing side of the cylinder head, exhaust runners extending generally downward from said cylinder head, an exhaust manifold being connected to the exhaust runners, the exhaust manifold extending along a first lateral face of the engine, a curved exhaust conduit being connected to a forward end of the exhaust manifold, the curved exhaust conduit extending upward at an angle across a forward end of the engine, the curved exhaust conduit being coupled to an exhaust pipe by a flexible joint, the exhaust pipe extending generally rearward and along a second lateral face of the engine, an intake manifold positioned generally above the exhaust manifold, the intake manifold being connected to intake runners, the intake runners extending to the intake ports, the intake manifold being connected to a throttle valve, an air rectifier positioned between the intake runners and the throttle valve, and at least an additional intake chamber connected to and being disposed upstream from the intake manifold, the intake chamber being disposed lower than the intake manifold.

* * * * *

UNITED STATES PATENT AND TRADEMARK OFFICE
CERTIFICATE OF CORRECTION

PATENT NO. : 7,247,067 B2
APPLICATION NO. : 10/866384
DATED : July 24, 2007
INVENTOR(S) : Tetsuya Mashiko It is certified that error appears in the above-identified patent and that said Letters Patent is hereby corrected as shown below:

At column 8, line 31, please delete "stem" and insert -- stern --, therefor.

At column 13, line 18, in claim 8, please delete "a" and insert -- an --, therefor.

Signed and Sealed this

Twenty-ninth Day of July, 2008

JON W. DUDAS
*Director of the United States Patent and Trademark Office*